US012619956B2

(12) United States Patent
Dion

(10) Patent No.: US 12,619,956 B2
(45) Date of Patent: May 5, 2026

(54) PREDICTIVE CARE OF CUSTOMER PREMISES EQUIPMENTS

(71) Applicant: Nokia Solutions and Networks Oy, Espoo (FI)

(72) Inventor: Gino Dion, Quispamsis (CA)

(73) Assignee: Nokia Solutions and Networks 0y, Espoo (FI)

( * ) Notice: Subject to any disclaimer, the term of this patent is extended or adjusted under 35 U.S.C. 154(b) by 254 days.

(21) Appl. No.: 18/103,436

(22) Filed: Jan. 30, 2023

(65) Prior Publication Data

US 2024/0257069 A1 Aug. 1, 2024

(51) Int. Cl.
*G06Q 30/00* (2023.01)
*G06Q 10/04* (2023.01)
*G06Q 10/20* (2023.01)

(52) U.S. Cl.
CPC ............. *G06Q 10/20* (2013.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 10,567,260 | B2 | 2/2020 | Wu et al. | |
| 11,416,325 | B2 | 8/2022 | Mann et al. | |
| 2003/0023412 | A1* | 1/2003 | Rappaport | ............. G06Q 10/10 703/1 |
| 2005/0081410 | A1* | 4/2005 | Furem | .................... E02F 9/267 709/200 |

| | | | | |
|---|---|---|---|---|
| 2009/0289787 | A1* | 11/2009 | Dawson | ............... G08B 27/003 340/540 |
| 2010/0219950 | A1* | 9/2010 | Kong | ................. G06K 7/10009 702/182 |
| 2011/0228665 | A1 | 9/2011 | Kumar | |
| 2013/0142043 | A1* | 6/2013 | Tapia | ................ H04W 28/0268 370/229 |
| 2014/0067327 | A1* | 3/2014 | Jiang | .................... G05B 23/024 702/185 |
| 2015/0135012 | A1* | 5/2015 | Bhalla | ................... H04L 41/147 714/26 |
| 2015/0160098 | A1* | 6/2015 | Noda | .................... G01M 99/00 702/35 |

(Continued)

FOREIGN PATENT DOCUMENTS

EP 3131234 A1 2/2017

OTHER PUBLICATIONS

Assessing the Impact of Data Sciences and Smart Technologies in Air Conditioning Project Management: A Delphi Method Analysis within the Construction Industry, Ali, Bashar Mahmood; Akkaş, Mehmet. Buildings 13.10: 2581. Basel: MDPI AG. (2023) (Year: 2023).*

(Continued)

*Primary Examiner* — Matthew T Sittner
(74) *Attorney, Agent, or Firm* — Tong, Rea, Bentley & Kim, LLC

(57) ABSTRACT

Various example embodiments for supporting predictive care of customer premises equipments are presented herein. Various example embodiments for supporting predictive care of customer premises equipments may be configured to support machine learning predictive care of customer premises equipments based on application of various machine learning capabilities.

18 Claims, 8 Drawing Sheets

(56) References Cited

U.S. PATENT DOCUMENTS

| | | | | |
|---|---|---|---|---|
| 2017/0011298 | A1* | 1/2017 | Pal | G06N 20/00 |
| 2017/0048109 | A1 | 2/2017 | Kant et al. | |
| 2017/0054605 | A1 | 2/2017 | Duncan et al. | |
| 2017/0083386 | A1* | 3/2017 | Wing | G06F 1/30 |
| 2017/0295078 | A1 | 10/2017 | Medas et al. | |
| 2017/0364819 | A1 | 12/2017 | Yang | |
| 2019/0123955 | A1* | 4/2019 | Chan | H04L 63/0853 |
| 2020/0026589 | A1 | 1/2020 | Ghosh et al. | |
| 2020/0051347 | A1* | 2/2020 | Bohl | G06Q 10/04 |
| 2022/0166682 | A1 | 5/2022 | Patrick et al. | |
| 2023/0025873 | A1* | 1/2023 | Jia | H04W 74/0816 |
| 2023/0195101 | A1* | 6/2023 | Berdouz Qrichi Aniba | G06F 18/24 |
| | | | | 700/28 |
| 2024/0428128 | A1* | 12/2024 | Kim | G06N 20/00 |

OTHER PUBLICATIONS

Akyamac Ahmet et al: "Predicting Home Network Problems Using Diverse Data", 2015 36th IEEE, Sarnoff Symposium, IEEE, Sep. 20, 2015 (Sep. 20, 2015), pp. 1-6.
Extended European Search Report in corresponding EP Patent Application No. 24152108.7-1215, dated Jun. 25, 2024, 10 pages.
Notice of Refusal, Japanese Application No. 2024-008530, dated Dec. 19, 2024, 12 pages.

* cited by examiner

*FIG. 2*

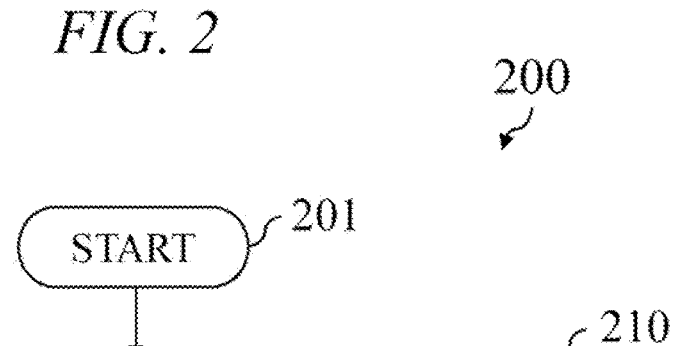

START ⌐201

210

DEFINE, FOR A CONDITION EXPERIENCED BY A SET OF CUSTOMER PREMISES EQUIPMENTS AND BASED ON USE OF MACHINE LEARNING FOR PROCESSING HISTORICAL CUSTOMER CARE DATA ASSOCIATED WITH THE SET OF CUSTOMER PREMISES EQUIPMENTS AND THE TIME-BASED CUSTOMER PREMISES EQUIPMENT OPERATING STATISTICS DATA ASSOCIATED WITH THE SET OF CUSTOMER PREMISES EQUIPMENTS, A PREDICTIVE SIGNATURE CONFIGURED TO PREDICT THAT THE CONDITION WILL BE EXPERIENCED WITHIN A TIME FRAME, WHEREIN THE SIGNATURE INCLUDES AN INDICATION OF THE CONDITION, AN OPERATING STATISTIC THRESHOLD FOR THE CONDITION, AND AN ACTION TO BE PERFORMED TO ADDRESS THE CONDITION

220

INITIATE, FOR A GIVEN CUSTOMER PREMISES EQUIPMENT BASED ON A DETERMINATION THAT THE PREDICTIVE SIGNATURE IS DETECTED FOR THE GIVEN CUSTOMER PREMISES EQUIPMENT BASED ON AN OPERATING STATISTIC OF THE GIVEN CUSTOMER PREMISES EQUIPMENT, THE ACTION TO BE PERFORMED TO ADDRESS THE CONDITION

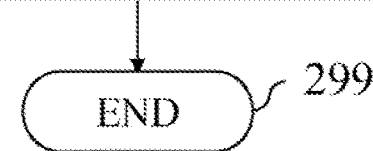

END ⌐299

*FIG. 3*

300

START ⌐ 301

⌐ 310

OBTAIN, FOR A SET OF CUSTOMER PREMISES
EQUIPMENTS, TIME-BASED CUSTOMER PREMISES
EQUIPMENT OPERATING STATISTICS DATA INDICATIVE
OF OPERATION OF THE SET OF CUSTOMER PREMISES
EQUIPMENTS

⌐ 320

OBTAIN, FOR THE SET OF CUSTOMER PREMISES
EQUIPMENTS, HISTORICAL CUSTOMER CARE DATA
IDENTIFYING A SET OF CUSTOMER CARE EVENTS
TRIGGERED FOR THE SET OF CUSTOMER PREMISES
EQUIPMENTS

TO BLOCK 330

*FIG. 3*
*CON'T*

300

FROM BLOCK 320

330

LEARN, BASED ON APPLICATION OF MACHINE LEARNING TO THE HISTORICAL CUSTOMER CARE DATA AND THE TIME-BASED CUSTOMER PREMISES EQUIPMENT OPERATING STATISTICS DATA, A LEARNED THRESHOLD FOR A CONDITION EXPERIENCED BY AT LEAST A PORTION OF THE CUSTOMER PREMISES EQUIPMENTS

340

DEFINE, FOR THE CONDITION EXPERIENCED BY AT LEAST A PORTION OF THE CUSTOMER PREMISES EQUIPMENTS, A PREDICTIVE SIGNATURE CONFIGURED TO PREDICT THAT THE CONDITION WILL BE EXPERIENCED WITHIN A TIME FRAME, WHEREIN THE PREDICTIVE SIGNATURE INCLUDES AN INDICATION OF THE CONDITION, AN OPERATING STATISTIC THRESHOLD FOR THE CONDITION THAT IS DETERMINED BASED ON THE LEARNED THRESHOLD, AND AN ACTION TO BE PERFORMED TO ADDRESS THE CONDITION

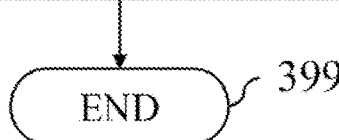

END          399

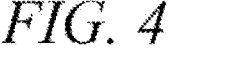

START 401

410

DETERMINE, FOR A GIVEN CUSTOMER PREMISES EQUIPMENT BASED ON AN OPERATING STATISTIC OF THE GIVEN CUSTOMER PREMISES EQUIPMENT, THAT A PREDICTIVE SIGNATURE IS DETECTED FOR THE GIVEN CUSTOMER PREMISES EQUIPMENT, WHEREIN THE PREDICTIVE SIGNATURE CONFIGURED TO INDICATE THAT A CONDITION WILL BE EXPERIENCED BY THE CUSTOMER PREMISES WITHIN A TIME FRAME, WHEREIN THE PREDICTIVE SIGNATURE INCLUDES AN INDICATION OF THE CONDITION, AN OPERATING STATISTIC THRESHOLD FOR THE CONDITION, AND AN ACTION TO BE PERFORMED TO ADDRESS THE CONDITION

420

INITIATE, FOR THE GIVEN CUSTOMER PREMISES EQUIPMENT BASED ON THE PREDICTIVE SIGNATURE, THE ACTION TO BE PERFORMED TO ADDRESS THE CONDITION

END 499

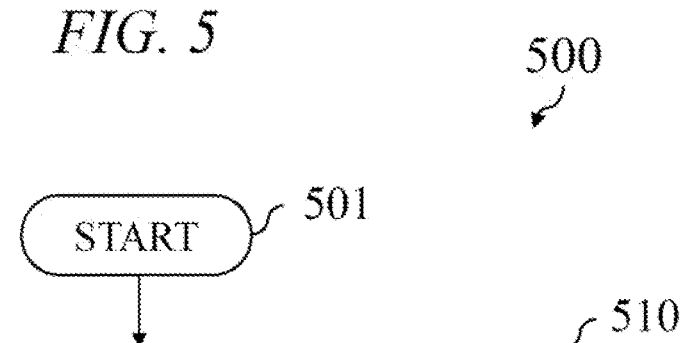

START — 501

510

OBTAIN, FOR A SET OF CUSTOMER PREMISES EQUIPMENTS, TIME-BASED CUSTOMER PREMISES EQUIPMENT OPERATING STATISTICS DATA INDICATIVE OF OPERATION OF THE SET OF CUSTOMER PREMISES EQUIPMENTS

520

OBTAIN, FOR THE SET OF CUSTOMER PREMISES EQUIPMENTS, HISTORICAL CUSTOMER CARE DATA IDENTIFYING A SET OF CUSTOMER CARE EVENTS TRIGGERED FOR THE SET OF CUSTOMER PREMISES EQUIPMENTS

530

LEARN, BASED ON APPLICATION OF MACHINE LEARNING TO THE HISTORICAL CUSTOMER CARE DATA AND THE TIME-BASED CUSTOMER PREMISES EQUIPMENT OPERATING STATISTICS DATA, A LEARNED THRESHOLD FOR A CONDITION EXPERIENCED BY AT LEAST A PORTION OF THE CUSTOMER PREMISES EQUIPMENTS

TO BLOCK 540

*FIG. 5*
*CON'T*

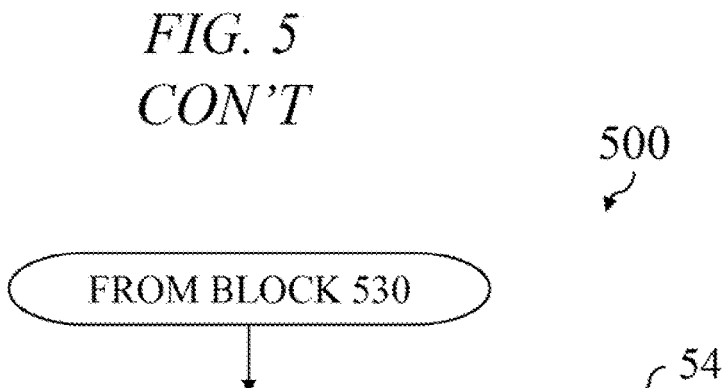

500

FROM BLOCK 530

540

DEFINE, FOR THE CONDITION EXPERIENCED BY AT LEAST A PORTION OF THE CUSTOMER PREMISES EQUIPMENTS, A PREDICTIVE SIGNATURE CONFIGURED TO PREDICT THAT THE CONDITION WILL BE EXPERIENCED WITHIN A TIME FRAME, WHEREIN THE PREDICTIVE SIGNATURE INCLUDES AN INDICATION OF THE CONDITION, AN OPERATING STATISTIC THRESHOLD FOR THE CONDITION THAT IS DETERMINED BASED ON THE LEARNED THRESHOLD, AND AN ACTION TO BE PERFORMED TO ADDRESS THE CONDITION

550

DETERMINE, FOR A GIVEN CUSTOMER PREMISES EQUIPMENT BASED ON AN OPERATING STATISTIC OF THE GIVEN CUSTOMER PREMISES EQUIPMENT, THAT THE PREDICTIVE SIGNATURE IS DETECTED FOR THE GIVEN CUSTOMER PREMISES EQUIPMENT

560

INITIATE, FOR THE GIVEN CUSTOMER PREMISES EQUIPMENT BASED ON THE PREDICTIVE SIGNATURE, THE ACTION TO BE PERFORMED TO ADDRESS THE CONDITION

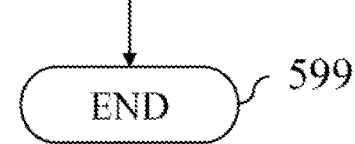

END     599

PREDICTIVE CARE OF CUSTOMER PREMISES EQUIPMENTS

TECHNICAL FIELD

Various example embodiments relate generally to communication systems and, more particularly but not exclusively, to providing support for customer premises equipment in communication systems.

BACKGROUND

In communication networks, various communications technologies may be used to support various types of communications.

SUMMARY

In at least some example embodiments, an apparatus includes at least one processor and at least one memory storing instructions that, when executed by the at least one processor, cause the apparatus at least to obtain, for a set of customer premises equipments, time-based customer premises equipment operating statistics data indicative of operation of the set of customer premises equipments, obtain, for the set of customer premises equipments, historical customer care data identifying a set of customer care events triggered for the set of customer premises equipments, learn, based on application of machine learning to the historical customer care data and the time-based customer premises equipment operating statistics data, a learned threshold for a condition experienced by at least a portion of the customer premises equipments, and define, for the condition experienced by at least a portion of the customer premises equipments, a predictive signature configured to predict that the condition will be experienced within a time frame, wherein the predictive signature includes an indication of the condition, an operating statistic threshold for the condition that is determined based on the learned threshold, and an action to be performed to address the condition. In at least some example embodiments, the time-based customer premises equipment operating statistics data includes at least one of a set of time-based customer premises equipment health statistics associated with ones of the customer premises equipment or a set of time-based customer premises equipment performance statistics associated with ones of the customer premises equipment. In at least some example embodiments, the time-based customer premises equipment operating statistics data includes at least one of a set of time-based operating statistics curves or a set of time-based operating statistics traces. In at least some example embodiments, to obtain the time-based customer premises equipment operating statistics data, the instructions, when executed by the at least one processor, cause the apparatus to obtain, for the set of customer premises equipments, a set of operating statistics measured by the customer premises equipments and a respective set of time stamps indicative of times at which the respective operating statistics were measured by the respective customer premises equipments and associate the time stamps with the operating statistics to form the time-based customer premises equipment operating statistics data. In at least some example embodiments, the set of operating statistics measured by the customer premises equipments includes at least one of a set of customer premises equipment health statistics associated with ones of the customer premises equipment or a set of customer premises equipment performance statistics associated with ones of the customer premises equipment. In at least some example embodiments, for at least one of the customer premises equipments, the set of operating statistics measured by the respective customer premises equipment includes at least one of at least one a wide area network statistic associated with a wide area network supporting the respective customer premises equipment, a radio access network statistic associated with a radio access network supporting the respective customer premises equipment, a WiFi statistic associated with a WiFi network supporting the respective customer premises equipment, an operating system statistic associated with operation of an operating system of the respective customer premises equipment, an application statistic associated with an application running on the respective customer premises equipment, or an environmental statistic associated with the respective customer premises equipment. In at least some example embodiments, the set of operating statistics measured by the customer premises equipments is received from at least one of the set of customer premises equipments or a customer premises equipment management system configured to provide management functions for the set of customer premises equipments. In at least some example embodiments, the time-based customer premises equipment operating statistics data is obtained from a time-series database configured to store a set of operating statistics measured by the customer premises equipments and a respective set of time stamps indicative of times at which the respective operating statistics were measured by the respective customer premises equipments. In at least some example embodiments, the historical customer care data includes at least one of customer care ticket data for a set of customer care tickets opened for the set of customer premises equipments, customer care workflow data for a set of customer care workflow operations performed for the set of customer premises equipments, or customer care dispatch data for a set of customer care dispatch events performed for the set of customer premises equipments. In at least some example embodiments, the historical customer care data is obtained from a service provider workflow management platform. In at least some example embodiments, the learned threshold for the condition represents a state of the condition at which a customer care action would be triggered for addressing the condition. In at least some example embodiments, the operating statistic threshold for the condition is determined, based on the learned threshold, in a manner tending to decrease a probability that the condition is experienced at a customer premises equipment and results in a failure of the customer premises equipment. In at least some example embodiments, the predictive signature includes at least one of a memory leak predictive signature in which the condition is a memory leak condition, the operating statistic threshold relates to a free memory statistic, and the action to be taken includes a reboot operation, a wireless signal interference predictive signature in which the condition is a wireless interference condition, the operating statistic threshold relates to at least one of a packets dropped statistics or a packets errored statistic, and the action to be taken includes a wireless channel switching operation, or a temperature anomaly predictive signature in which the condition is a temperature anomaly condition, the operating statistic threshold relates to a customer premises equipment temperature statistic, and the action to be taken includes at least one of sending a message to a customer or dispatching a technician. In at least some example embodiments, the instructions, when executed by the at least one processor, cause the apparatus at least to determine, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition and initiate, for the given customer premises equipment based on the predictive signature, the action to be performed to address the condition.

In at least some example embodiments, a non-transitory computer readable medium includes computer program instructions that, when executed by an apparatus, cause the apparatus at least to obtain, for a set of customer premises equipments, time-based customer premises equipment operating statistics data indicative of operation of the set of customer premises equipments, obtain, for the set of customer premises equipments, historical customer care data identifying a set of customer care events triggered for the set of customer premises equipments, learn, based on application of machine learning to the historical customer care data and the time-based customer premises equipment operating statistics data, a learned threshold for a condition experienced by at least a portion of the customer premises equipments, and define, for the condition experienced by at least a portion of the customer premises equipments, a predictive signature configured to predict that the condition will be experienced within a time frame, wherein the predictive signature includes an indication of the condition, an operating statistic threshold for the condition that is determined based on the learned threshold, and an action to be performed to address the condition. In at least some example embodiments, the time-based customer premises equipment operating statistics data includes at least one of a set of time-based customer premises equipment health statistics associated with ones of the customer premises equipment or a set of time-based customer premises equipment performance statistics associated with ones of the customer premises equipment. In at least some example embodiments, the time-based customer premises equipment operating statistics data includes at least one of a set of time-based operating statistics curves or a set of time-based operating statistics traces. In at least some example embodiments, to obtain the time-based customer premises equipment operating statistics data, the computer program instructions, when executed by the apparatus, cause the apparatus to obtain, for the set of customer premises equipments, a set of operating statistics measured by the customer premises equipments and a respective set of time stamps indicative of times at which the respective operating statistics were measured by the respective customer premises equipments and associate the time stamps with the operating statistics to form the time-based customer premises equipment operating statistics data. In at least some example embodiments, the set of operating statistics measured by the customer premises equipments includes at least one of a set of customer premises equipment health statistics associated with ones of the customer premises equipment or a set of customer premises equipment performance statistics associated with ones of the customer premises equipment. In at least some example embodiments, for at least one of the customer premises equipments, the set of operating statistics measured by the respective customer premises equipment includes at least one of at least one a wide area network statistic associated with a wide area network supporting the respective customer premises equipment, a radio access network statistic associated with a radio access network supporting the respective customer premises equipment, a WiFi statistic associated with a WiFi network supporting the respective customer premises equipment, an operating system statistic associated with operation of an operating system of the respective customer premises equipment, an application statistic associated with an application running on the respective customer premises equipment, or an environmental statistic associated with the respective customer premises equipment. In at least some example embodiments, the set of operating statistics measured by the customer premises equipments is received from at least one of the set of customer premises equipments or a customer premises equipment management system configured to provide management functions for the set of customer premises equipments. In at least some example embodiments, the time-based customer premises equipment operating statistics data is obtained from a time-series database configured to store a set of operating statistics measured by the customer premises equipments and a respective set of time stamps indicative of times at which the respective operating statistics were measured by the respective customer premises equipments. In at least some example embodiments, the historical customer care data includes at least one of customer care ticket data for a set of customer care tickets opened for the set of customer premises equipments, customer care workflow data for a set of customer care workflow operations performed for the set of customer premises equipments, or customer care dispatch data for a set of customer care dispatch events performed for the set of customer premises equipments. In at least some example embodiments, the historical customer care data is obtained from a service provider workflow management platform. In at least some example embodiments, the learned threshold for the condition represents a state of the condition at which a customer care action would be triggered for addressing the condition. In at least some example embodiments, the operating statistic threshold for the condition is determined, based on the learned threshold, in a manner tending to decrease a probability that the condition is experienced at a customer premises equipment and results in a failure of the customer premises equipment. In at least some example embodiments, the predictive signature includes at least one of a memory leak predictive signature in which the condition is a memory leak condition, the operating statistic threshold relates to a free memory statistic, and the action to be taken includes a reboot operation, a wireless signal interference predictive signature in which the condition is a wireless interference condition, the operating statistic threshold relates to at least one of a packets dropped statistics or a packets errored statistic, and the action to be taken includes a wireless channel switching operation, or a temperature anomaly predictive signature in which the condition is a temperature anomaly condition, the operating statistic threshold relates to a customer premises equipment temperature statistic, and the action to be taken includes at least one of sending a message to a customer or dispatching a technician. In at least some example embodiments, the computer program instructions, when executed by the apparatus, cause the apparatus at least to determine, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition and initiate, for the given customer premises equipment based on the predictive signature, the action to be performed to address the condition.

In at least some example embodiments, a method includes obtaining, for a set of customer premises equipments, time-based customer premises equipment operating statistics data indicative of operation of the set of customer premises equipments, obtaining, for the set of customer premises equipments, historical customer care data identifying a set of customer care events triggered for the set of customer premises equipments, learning, based on application of machine learning to the historical customer care data and the time-based customer premises equipment operating statistics data, a learned threshold for a condition experienced by at least a portion of the customer premises equipments, and defining, for the condition experienced by at least a portion of the customer premises equipments, a predictive signature configured to predict that the condition will be experienced within a time frame, wherein the predictive signature includes an indication of the condition, an operating statistic threshold for the condition that is determined based on the learned threshold, and an action to be performed to address the condition. In at least some example embodiments, the time-based customer premises equipment operating statistics data includes at least one of a set of time-based customer premises equipment health statistics associated with ones of the customer premises equipment or a set of time-based customer premises equipment performance statistics associated with ones of the customer premises equipment. In at least some example embodiments, the time-based customer premises equipment operating statistics data includes at least one of a set of time-based operating statistics curves or a set of time-based operating statistics traces. In at least some example embodiments, obtaining the time-based customer premises equipment operating statistics data includes obtaining, for the set of customer premises equipments, a set of operating statistics measured by the customer premises equipments and a respective set of time stamps indicative of times at which the respective operating statistics were measured by the respective customer premises equipments and associating the time stamps with the operating statistics to form the time-based customer premises equipment operating statistics data. In at least some example embodiments, the set of operating statistics measured by the customer premises equipments includes at least one of a set of customer premises equipment health statistics associated with ones of the customer premises equipment or a set of customer premises equipment performance statistics associated with ones of the customer premises equipment. In at least some example embodiments, for at least one of the customer premises equipments, the set of operating statistics measured by the respective customer premises equipment includes at least one of at least one a wide area network statistic associated with a wide area network supporting the respective customer premises equipment, a radio access network statistic associated with a radio access network supporting the respective customer premises equipment, a WiFi statistic associated with a WiFi network supporting the respective customer premises equipment, an operating system statistic associated with operation of an operating system of the respective customer premises equipment, an application statistic associated with an application running on the respective customer premises equipment, or an environmental statistic associated with the respective customer premises equipment. In at least some example embodiments, the set of operating statistics measured by the customer premises equipments is received from at least one of the set of customer premises equipments or a customer premises equipment management system configured to provide management functions for the set of customer premises equipments. In at least some example embodiments, the time-based customer premises equipment operating statistics data is obtained from a time-series database configured to store a set of operating statistics measured by the customer premises equipments and a respective set of time stamps indicative of times at which the respective operating statistics were measured by the respective customer premises equipments. In at least some example embodiments, the historical customer care data includes at least one of customer care ticket data for a set of customer care tickets opened for the set of customer premises equipments, customer care workflow data for a set of customer care workflow operations performed for the set of customer premises equipments, or customer care dispatch data for a set of customer care dispatch events performed for the set of customer premises equipments. In at least some example embodiments, the historical customer care data is obtained from a service provider workflow management platform. In at least some example embodiments, the learned threshold for the condition represents a state of the condition at which a customer care action would be triggered for addressing the condition. In at least some example embodiments, the operating statistic threshold for the condition is determined, based on the learned threshold, in a manner tending to decrease a probability that the condition is experienced at a customer premises equipment and results in a failure of the customer premises equipment. In at least some example embodiments, the predictive signature includes at least one of a memory leak predictive signature in which the condition is a memory leak condition, the operating statistic threshold relates to a free memory statistic, and the action to be taken includes a reboot operation, a wireless signal interference predictive signature in which the condition is a wireless interference condition, the operating statistic threshold relates to at least one of a packets dropped statistics or a packets errored statistic, and the action to be taken includes a wireless channel switching operation, or a temperature anomaly predictive signature in which the condition is a temperature anomaly condition, the operating statistic threshold relates to a customer premises equipment temperature statistic, and the action to be taken includes at least one of sending a message to a customer or dispatching a technician. In at least some example embodiments, the method includes determining, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition and initiating, for the given customer premises equipment based on the predictive signature, the action to be performed to address the condition.

In at least some example embodiments, an apparatus includes means for obtaining, for a set of customer premises equipments, time-based customer premises equipment operating statistics data indicative of operation of the set of customer premises equipments, means for obtaining, for the set of customer premises equipments, historical customer care data identifying a set of customer care events triggered for the set of customer premises equipments, means for learning, based on application of machine learning to the historical customer care data and the time-based customer premises equipment operating statistics data, a learned threshold for a condition experienced by at least a portion of the customer premises equipments, and means for defining, for the condition experienced by at least a portion of the customer premises equipments, a predictive signature configured to predict that the condition will be experienced within a time frame, wherein the predictive signature includes an indication of the condition, an operating statistic threshold for the condition that is determined based on the learned threshold, and an action to be performed to address the condition. In at least some example embodiments, the time-based customer premises equipment operating statistics data includes at least one of a set of time-based customer premises equipment health statistics associated with ones of the customer premises equipment or a set of time-based customer premises equipment performance statistics associated with ones of the customer premises equipment. In at least some example embodiments, the time-based customer premises equipment operating statistics data includes at least one of a set of time-based operating statistics curves or a set of time-based operating statistics traces. In at least some example embodiments, the means for obtaining the time-based customer premises equipment operating statistics data includes means for obtaining, for the set of customer premises equipments, a set of operating statistics measured by the customer premises equipments and a respective set of time stamps indicative of times at which the respective operating statistics were measured by the respective customer premises equipments and means for associating the time stamps with the operating statistics to form the time-based customer premises equipment operating statistics data. In at least some example embodiments, the set of operating statistics measured by the customer premises equipments includes at least one of a set of customer premises equipment health statistics associated with ones of the customer premises equipment or a set of customer premises equipment performance statistics associated with ones of the customer premises equipment. In at least some example embodiments, for at least one of the customer premises equipments, the set of operating statistics measured by the respective customer premises equipment includes at least one of at least one a wide area network statistic associated with a wide area network supporting the respective customer premises equipment, a radio access network statistic associated with a radio access network supporting the respective customer premises equipment, a WiFi statistic associated with a WiFi network supporting the respective customer premises equipment, an operating system statistic associated with operation of an operating system of the respective customer premises equipment, an application statistic associated with an application running on the respective customer premises equipment, or an environmental statistic associated with the respective customer premises equipment. In at least some example embodiments, the set of operating statistics measured by the customer premises equipments is received from at least one of the set of customer premises equipments or a customer premises equipment management system configured to provide management functions for the set of customer premises equipments. In at least some example embodiments, the time-based customer premises equipment operating statistics data is obtained from a time-series database configured to store a set of operating statistics measured by the customer premises equipments and a respective set of time stamps indicative of times at which the respective operating statistics were measured by the respective customer premises equipments. In at least some example embodiments, the historical customer care data includes at least one of customer care ticket data for a set of customer care tickets opened for the set of customer premises equipments, customer care workflow data for a set of customer care workflow operations performed for the set of customer premises equipments, or customer care dispatch data for a set of customer care dispatch events performed for the set of customer premises equipments. In at least some example embodiments, the historical customer care data is obtained from a service provider workflow management platform. In at least some example embodiments, the learned threshold for the condition represents a state of the condition at which a customer care action would be triggered for addressing the condition. In at least some example embodiments, the operating statistic threshold for the condition is determined, based on the learned threshold, in a manner tending to decrease a probability that the condition is experienced at a customer premises equipment and results in a failure of the customer premises equipment. In at least some example embodiments, the predictive signature includes at least one of a memory leak predictive signature in which the condition is a memory leak condition, the operating statistic threshold relates to a free memory statistic, and the action to be taken includes a reboot operation, a wireless signal interference predictive signature in which the condition is a wireless interference condition, the operating statistic threshold relates to at least one of a packets dropped statistics or a packets errored statistic, and the action to be taken includes a wireless channel switching operation, or a temperature anomaly predictive signature in which the condition is a temperature anomaly condition, the operating statistic threshold relates to a customer premises equipment temperature statistic, and the action to be taken includes at least one of sending a message to a customer or dispatching a technician. In at least some example embodiments, the apparatus includes means for determining, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition and means for initiating, for the given customer premises equipment based on the predictive signature, the action to be performed to address the condition.

In at least some example embodiments, an apparatus includes at least one processor and at least one memory storing instructions that, when executed by the at least one processor, cause the apparatus at least to determine, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition and initiate, for the given customer premises equipment based on the predictive signature, the action to be performed to address the condition. In at least some example embodiments, to determine that the predictive signature is detected for the given customer premises equipment, the instructions, when executed by the at least one processor, cause the apparatus at least to obtain the operating statistic of the given customer premises equipment and determine, based on the operating statistic of the given customer premises equipment and the operating statistic threshold of the predictive signature, that the predictive signature is detected for the given customer premises equipment. In at least some example embodiments, the predictive signature includes at least one of a memory leak predictive signature in which the condition is a memory leak condition, the operating statistic threshold relates to a free memory statistic, and the action to be taken includes a reboot operation, a wireless signal interference predictive signature in which the condition is a wireless interference condition, the operating statistic threshold relates to at least one of a packets dropped statistics or a packets errored statistic, and the action to be taken includes a wireless channel switching operation, or a temperature anomaly predictive signature in which the condition is a temperature anomaly condition, the operating statistic threshold relates to a customer premises equipment temperature statistic, and the action to be taken includes at least one of sending a message to a customer or dispatching a technician. In at least some example embodiments, to initiate the action to be performed to address the condition, the instructions, when executed by the at least one processor, cause the apparatus at least to identify, from the predictive signature based on detection of the predictive signature for the given customer premises equipment, the action to be performed to address the condition and send, toward the given customer premises equipment, a message including an indication of the action to be performed to address the condition. In at least some example embodiments, the action to be performed to address the condition includes at least one of a reconfiguration of the given customer premises equipment, a reset of the given customer premises equipment, or a reboot of the given customer premises equipment.

In at least some example embodiments, a non-transitory computer readable medium includes computer program instructions that, when executed by an apparatus, cause the apparatus at least to determine, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition and initiate, for the given customer premises equipment based on the predictive signature, the action to be performed to address the condition. In at least some example embodiments, to determine that the predictive signature is detected for the given customer premises equipment, the computer program instructions, when executed by the apparatus, cause the apparatus at least to obtain the operating statistic of the given customer premises equipment and determine, based on the operating statistic of the given customer premises equipment and the operating statistic threshold of the predictive signature, that the predictive signature is detected for the given customer premises equipment. In at least some example embodiments, the predictive signature includes at least one of a memory leak predictive signature in which the condition is a memory leak condition, the operating statistic threshold relates to a free memory statistic, and the action to be taken includes a reboot operation, a wireless signal interference predictive signature in which the condition is a wireless interference condition, the operating statistic threshold relates to at least one of a packets dropped statistics or a packets errored statistic, and the action to be taken includes a wireless channel switching operation, or a temperature anomaly predictive signature in which the condition is a temperature anomaly condition, the operating statistic threshold relates to a customer premises equipment temperature statistic, and the action to be taken includes at least one of sending a message to a customer or dispatching a technician. In at least some example embodiments, to initiate the action to be performed to address the condition, the computer program instructions, when executed by the apparatus, cause the apparatus at least to identify, from the predictive signature based on detection of the predictive signature for the given customer premises equipment, the action to be performed to address the condition and send, toward the given customer premises equipment, a message including an indication of the action to be performed to address the condition. In at least some example embodiments, the action to be performed to address the condition includes at least one of a reconfiguration of the given customer premises equipment, a reset of the given customer premises equipment, or a reboot of the given customer premises equipment.

In at least some example embodiments, a method includes determining, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition and initiating, for the given customer premises equipment based on the predictive signature, the action to be performed to address the condition. In at least some example embodiments, determining that the predictive signature is detected for the given customer premises equipment includes obtaining the operating statistic of the given customer premises equipment and determining, based on the operating statistic of the given customer premises equipment and the operating statistic threshold of the predictive signature, that the predictive signature is detected for the given customer premises equipment. In at least some example embodiments, the predictive signature includes at least one of a memory leak predictive signature in which the condition is a memory leak condition, the operating statistic threshold relates to a free memory statistic, and the action to be taken includes a reboot operation, a wireless signal interference predictive signature in which the condition is a wireless interference condition, the operating statistic threshold relates to at least one of a packets dropped statistics or a packets errored statistic, and the action to be taken includes a wireless channel switching operation, or a temperature anomaly predictive signature in which the condition is a temperature anomaly condition, the operating statistic threshold relates to a customer premises equipment temperature statistic, and the action to be taken includes at least one of sending a message to a customer or dispatching a technician. In at least some example embodiments, initiating the action to be performed to address the condition includes identifying, from the predictive signature based on detection of the predictive signature for the given customer premises equipment, the action to be performed to address the condition and sending, toward the given customer premises equipment, a message including an indication of the action to be performed to address the condition. In at least some example embodiments, the action to be performed to address the condition includes at least one of a reconfiguration of the given customer premises equipment, a reset of the given customer premises equipment, or a reboot of the given customer premises equipment.

In at least some example embodiments, an apparatus includes means for determining, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition and means for initiating, for the given customer premises equipment based on the predictive signature, the action to be performed to address the condition. In at least some example embodiments, the means for determining that the predictive signature is detected for the given customer premises equipment includes means for obtaining the operating statistic of the given customer premises equipment and means for determining, based on the operating statistic of the given customer premises equipment and the operating statistic threshold of the predictive signature, that the predictive signature is detected for the given customer premises equipment. In at least some example embodiments, the predictive signature includes at least one of a memory leak predictive signature in which the condition is a memory leak condition, the operating statistic threshold relates to a free memory statistic, and the action to be taken includes a reboot operation, a wireless signal interference predictive signature in which the condition is a wireless interference condition, the operating statistic threshold relates to at least one of a packets dropped statistics or a packets errored statistic, and the action to be taken includes a wireless channel switching operation, or a temperature anomaly predictive signature in which the condition is a temperature anomaly condition, the operating statistic threshold relates to a customer premises equipment temperature statistic, and the action to be taken includes at least one of sending a message to a customer or dispatching a technician. In at least some example embodiments, the means for initiating the action to be performed to address the condition includes means for identifying, from the predictive signature based on detection of the predictive signature for the given customer premises equipment, the action to be performed to address the condition and means for sending, toward the given customer premises equipment, a message including an indication of the action to be performed to address the condition. In at least some example embodiments, the action to be performed to address the condition includes at least one of a reconfiguration of the given customer premises equipment, a reset of the given customer premises equipment, or a reboot of the given customer premises equipment.

BRIEF DESCRIPTION OF THE DRAWINGS

The teachings herein can be readily understood by considering the following detailed description in conjunction with the accompanying drawings, in which:

FIG. 2 depicts an example embodiment of a method for supporting predictive care of customer premises equipments:

FIG. 3 depicts an example embodiment of a method for generating a predictive signature for use in supporting predictive care of customer premises equipments:

FIG. 4 depicted an example embodiment of a method for using a predictive signature for supporting predictive care of customer premises equipments:

FIG. 5 depicts an example embodiment of a method for supporting predictive care of customer premises equipments.

To facilitate understanding, identical reference numerals have been used herein, wherever possible, in order to designate identical elements that are common among the various figures.

DETAILED DESCRIPTION

Figure 1:
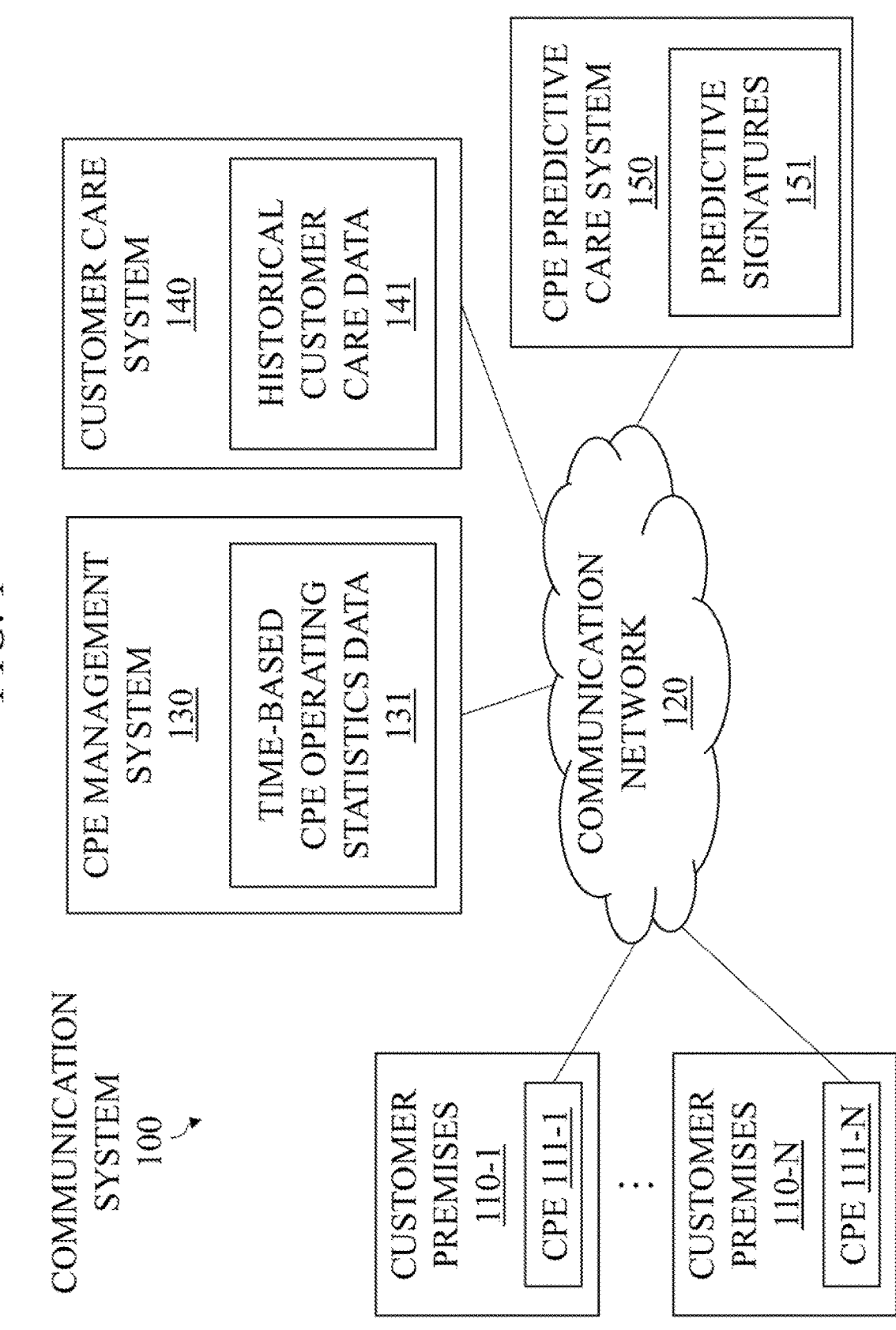
FIG. 1 depicts an example embodiment of a communication system configured to support predictive care of customer premises equipments.

Various example embodiments for supporting predictive care of customer premises equipments are presented herein. Various example embodiments for supporting predictive care of customer premises equipments may be configured to support machine learning based predictive care of customer premises equipments based on application of various types of machine learning capabilities to various types of data associated with supporting service assurance functions for customer premises equipments.

Various example embodiments for supporting predictive care of customer premises equipments may be configured to apply machine learning to service assurance concepts. Various example embodiments for supporting predictive care of customer premises equipment may be configured to support service assurance for customer premises equipments, based on use of machine learning and/or artificial intelligence within the context of a feedback loop that validates the assertions associated with the service assurance for the customer premises equipments. Various example embodiments for supporting predictive care of customer premises equipment may be configured to provide a feedback loop that validates the assertions associated with the service assurance for the customer premises equipments by feeding historical customer care data of the service provider (e.g., actual historical records of customer care workflow issues data (e.g., from customers calling in, using self-service portals, or the like), workflow management data, trouble ticket dispatch data, or the like) to machine learning processes so that a unique mapping of traditional statistics can be achieved, providing fully adaptive threshold points that predict when a condition that may result in a customer care call or dispatch is going to occur (and, therefore, that predict when a customer care call or dispatch is about to occur).

Various example embodiments for supporting predictive care of customer premises equipment may be configured to support service assurance for customer premises equipments, based on use of machine learning and/or artificial intelligence within the context of a feedback loop that validates the assertions associated with the service assurance for the customer premises equipments. The platform may predict when, from the point of view of the end customer, a customer premises equipment problem would occur, and pro-actively taking steps to prevent the customer premises equipment problem from occurring in the first place. The platform, based on use of a feedback loop of using the customer care data (e.g., call, ticket, and/or dispatch data), and applying machine learning to the customer care data and the combination of the customer premises equipment data points at those exact point in times when problems did in fact occur, overcomes the complexity of tracking the rapidly-moving targets of the thresholds for conditions experienced by the customer premises equipments and enables predictions of conditions at customer premises equipments that may result in problems at the customer premises equipments.

Various example embodiments for supporting predictive care of customer premises equipments may be configured to support truly predictive customer premises equipment service assurance, by applying machine learning techniques to the combination of operating statistics associated with operation of customer premises equipments and historical customer care data associated with the operation of the customer premises equipments, thereby enabling, with a high degree of accuracy, predictions of when a service interruption might occur, and allowing for proactive actions to take place before the service interruption actually takes place. Various example embodiments for supporting predictive care of customer premises equipments may be configured to combine analytics of operating data (e.g., customer premises equipment statistics, network statistics, or the like, as well as various combinations thereof) with historical customer care workflow data (e.g., ticket, workflow; and/or dispatch data) to provide a predictive index of a customer care issue (e.g., occurrence of a customer care issue at the customer premises equipment and/or reporting of a customer care issue by the customer) within a particular time frame (e.g., within the next 24 hours, 48 hours, week, month or the like) and with a particular degree of confidence (e.g., at least 70% confidence, at least 75% confidence, at least 85% confidence, or the like).

Various example embodiments for supporting predictive care of customer premises equipments may be configured to provide a framework that automatically learns the various threshold points which, when crossed or violated, trigger a customer care call, ticket, or dispatch to take place. These thresholds are validated in a full feedback loop, across a wide variety of metrics and data points from the customer premises equipments (e.g., wide area network (WAN) statistics associated with a WAN support the customer premises equipments, radio access network (RAN) statistics associated with a RAN supporting the customer premises equipments, WiFi statistics associated with a WiFi network supporting the customer premises equipments, operating system (OS) statistics associated with operation of OSs of the customer premises equipments, application statistics associated with applications running on the customer premises equipments, environmental statistics associated with the customer premises equipments, or the like, as well as various combinations thereof) by analyzing the historical workflow customer care data. The framework, after learning the thresholds, can then apply various predictive and proactive automated actions to rectify and prevent the issue from ever causing a customer care call, ticket, or dispatch. This would have a significant impact on the reduction of operating expenditure (OPEX) costs for the service provider, while at the same time increasing customer satisfaction.

Various example embodiments for supporting predictive care of customer premises equipments may be configured to use a combination of historical customer care data (e.g., customer care ticket, workflow, and dispatch data, from the service provider customer care management platform, which indicates when and why end users experienced problems that were significant enough to trigger a care call, ticket, or dispatch) and customer premises equipment operating statistics data (e.g., time-based customer premises equipment operating statistics data, which may be in the form of customer premises equipment operating data curves generated based on storage of customer premises equipment operating statistics data within a time-series database) to compute threshold points of various dimensions of customer premises equipment health and performance data which may be used to detect conditions at customer premises equipments before associated problems occur and, thus, before the care calls, tickets, and/or dispatches that might otherwise result. The threshold points of various dimensions of customer premises equipment health and performance data which may be used to detect conditions at customer premises equipments before associated problems occur may be computed based on use of machine learning to cross-reference the historical customer care data against the time-based customer premises equipment operating statistics data. The resulting threshold points of various dimensions of customer premises equipment health and performance data may then be used to define predictive signatures which may be used to detect various types of conditions at customer premises equipments before associated problems occur and, thus, before the care calls, tickets, and/or dispatches that might otherwise result.

Various example embodiments for supporting predictive care of customer premises equipment may be configured to support predictive, proactive care, rather than reactive care (e.g., in which problems are resolved only after the problems actual occur), by accurately predicting impending problems before the impending problems occur and taking proactive steps to prevent the impending problems from occurring. Various example embodiments for supporting predictive care of customer premises equipments may be configured to support predictive care of customer premises equipments in a highly dynamic environment (e.g., where there may be changes to conditions at the customer premises equipments, changes to software on the customer premises equipments, changes to network conditions in the network supporting the customer premises equipments, or the like, as well as various combinations thereof) without a need for constant intervention (e.g., planning, tuning, and so forth) which typically results in significantly greater false positives, complexity, and cost.

It will be appreciated that these and various other example embodiments for supporting predictive care of customer premises equipments, and advantages or potential advantages of example embodiments for supporting predictive care of customer premises equipments, may be further understood by way of reference to the various figures, which are discussed further below.

FIG. 1 depicts an example embodiment of a communication system configured to support predictive care of customer premises equipment.

The communication system 100 includes a set of customer premises 110-1 to 110-N (collectively, customer premises 110) including a set of customer premises equipments 111-1 to 111-N (collectively, customer premises equipments 111), a communication network 120 supporting communications of the customer premises equipments 111, a customer premises equipment management system 130 configured to support management of the customer premises equipments 111, a customer care system 140 may be configured to support customer care for the customer premises equipments 111, and a customer premises equipment predictive care system 150 is configured to support various functions for providing predictive care for the customer premises equipments 111. It will be appreciated that the communication system 100 may include various other elements which have been omitted for purposes of clarity.

The customer premises 110 represent customer locations at which customer premises equipments 111 are deployed. For example, the customer premises 110 may include homes, business locations, or the like. The customer premises equipments 111 may be devices which operate as interfaces between the customer premises 110 and the communication network 120 supporting communications for the customer premises 110. For example, the customer premises equipments may include optical network terminals (ONTs), residential gateways, fixed-wireless-access gateways, or the like. The customer premises equipments 111 may be configured to support communications of various other customer devices which may be located at the customer premises 110 (e.g., smartphones, computers, set top boxes, smart televisions, gaming systems, smart appliances, Internet-of-Things (IoT) devices, or the like, as well as various combinations thereof), which have been omitted for purposes of clarity.

The customer premises equipments 111 may be configured to support various functions which may be used for supporting customer care (and, thus, service assurance) for the customer premises equipments 111, such as by supporting collection and reporting of operating statistics associated with operation of the customer premises equipments 111 (e.g., customer premises equipment health statistics, customer premises equipment performance statistics, or the like, as well as various combinations thereof), supporting actions (e.g., reconfigurations, resets, reboots, or the like) requested by management systems (e.g., the customer premises equipment management system 130, the customer care system 140, and/or the customer premises equipment predictive care system 150) within the context of supporting customer care for the customer premises equipments 111, or the like, as well as various combinations thereof.

The customer premises equipments 111, as indicated above, may be configured to support customer care by supporting collection and reporting of operating statistics associated with operation of the customer premises equipments 111. For example, the operating statistics collected and reported by the customer premises equipments 111 may include at least one of at least one a wide area network statistic associated with a wide area network supporting the customer premises equipments 111, a radio access network statistic associated with a radio access network supporting the customer premises equipments 111, a WiFi statistic associated with a WiFi network supporting the customer premises equipments 111, an operating system statistic associated with operation of an operating system of the customer premises equipments 111, an application statistic associated with an application running on the customer premises equipments 111, an environmental statistic associated with the customer premises equipments 111, or the like, as well as various combinations thereof. It will be appreciated that the customer premises equipments 111 may be configured to support collection and reporting of various other types of operating statistics associated with operation of the customer premises equipments 111.

The customer premises equipments 111, as indicated above, may be configured to support customer care by supporting actions requested by management systems (e.g., the customer premises equipment management system 130, the customer care system 140, and/or the customer premises equipment predictive care system 150) within the context of supporting customer care for the customer premises equipments 111. For example, the actions requested by management systems and performed by the customer premises equipments 111 may include reconfiguration actions (e.g., downloading and installing updated operating settings used by customer premises equipments 111 for handling customer traffic, downloading and installing updated software (e.g., operating system software, protocol stack software, or the like) at the customer premises equipments 111, triggering customer premises equipments 111 to switch to different communications channels (e.g., a different optical wavelength, a different WiFi channel, or the like), or the like, as well as various combinations thereof), resetting of the customer premises equipments 111, rebooting of the customer premises equipments 111, or the like, as well as various combinations thereof. It will be appreciated that the customer premises equipments may be configured to support various other actions requested by management systems within the context of supporting customer care for the customer premises equipments 111.

The communication network 120 may be configured to support communications of the customer premises equipments 111 at the customer premises 110, as well as to support communications of the various elements involved in managements of and customer care for the customer premises equipments 111 at the customer premises 110. The communication network 120 may be based on various types of communications technologies, which may depend on the types of customer premises equipments 111 supported. For example, the communication network 120 may support wired access by the customer premises equipments 111 (e.g., optical networks and networking such as in a fiber-to-the-home (FTTH) network, cable-based networks and networking, or the like, as well as various combinations thereof), wireless access by the customer premises equipments 111 (e.g., cellular-based access, WiFi-based access, or the like, as well as various combinations thereof), or the like, as well as various combinations thereof. The communication network 120 may include various communications elements (omitted for purposes of clarity) which may support communications of the customer premises equipments 111 at the customer premises 110 and communications of the various elements involved in managements of and customer care for the customer premises equipments 111 at the customer premises 110, such as wired communications devices (e.g., routers, switches, gateways, or the like), wireless communications devices (e.g., radio access network (RAN) devices, wireless access points (WAPs), core wireless network elements, or the like), communication and communication management support elements (e.g., policy controllers, policy and charging rules functions, or the like), or the like, as well as various combinations thereof. It will be appreciated that the communication network 120 may support various other communications functions.

The customer premises equipment management system 130 may be configured to support management of the customer premises equipments 111. The customer premises equipment management system 130 may be configured to supporting configuration of the customer premises equipments 111, monitoring of the customer premises equipments 111, reconfiguration of the customer premises equipments 111, control over operation of the customer premises equipments 111, or the like, as well as various combinations thereof. The customer premises equipment management system 130 may be configured to control reporting of operating statistics measured by the customer premises equipments 111 (e.g., periodically polling the customer premises equipments 111 for various operating statistics, configuring the customer premises equipments 111 to periodically measure and report various operating statistics, requesting various operating statistics from the customer premises equipments 111 under various conditions, or the like, as well as various combinations thereof). The customer premises equipment management system 130 may be configured to receive and store customer premises equipment operating statistics data measured and provided by the customer premises equipments 111, where such customer premises equipment operating statistics data may include raw operating statistics data received from the customer premises equipments 111, processed operating statistics data generated based on processing of raw operating statistics data received from the customer premises equipments 111, or the like, as well as various combinations thereof.

The customer premises equipment management system 130 may be configured to support predictive care functions for supporting predictive care of the customer premises equipments 111. The customer premises equipment management system 130 may be configured to obtain customer premises equipment operating statistics data, measured and provided by the customer premises equipments 111, for use by the customer premises equipment predictive care system 150 in providing predictive care for the customer premises equipments 111. The customer premises equipment management system 130 may be configured to generate and maintain time-based customer premises equipment operating statistics data 131 for use by the customer premises equipment predictive care system 150 in providing predictive care for the customer premises equipments 111. For example, the customer premises equipment management system 130 may generate the time-based customer premises equipment operating statistics data 131 by obtaining, for the customer premises equipments 111, operating statistics measured by the customer premises equipments 111 and time stamps indicative of times at which the operating statistics were measured by the customer premises equipments 111, and associating the time stamps with the operating statistics to form the time-based customer premises equipment operating statistics data 131. The customer premises equipment management system 130 may be configured to support predictive care actions initiated by the customer premises equipment predictive care system 150 in providing predictive care for the customer premises equipments 111. For example, the customer premises equipment management system 130 may be configured to receive a request for execution of an action for a customer premises equipment 111 (e.g., a request by the customer premises equipment predictive care system 150 for reconfiguration, resetting, or rebooting of the customer premises equipment 111) and send a message toward the customer premises equipment 111 for triggering execution of the action for the customer premises equipment 111 (e.g., based on one or more messages sent to the customer premises equipments 111). It will be appreciated that the customer premises equipment management system 130 may be configured to support various other predictive care functions for supporting predictive care of the customer premises equipments 111.

The time-based customer premises equipment operating statistics data 131 may include various types of customer premises operating statistics data, may be maintained in various forms, or the like, as well as various combinations thereof. The time-based customer premises equipment operating statistics data 131 may be maintained in a time-series database (TSDB), from which time-based operating statistics curves and/or a time-based operating statistics traces may be generated. The time-based customer premises equipment operating statistics data 131 may include such time-based operating statistics curves and/or a time-based operating statistics traces. It will be appreciated that the time-based customer premises equipment operating statistics data 131 may include various other types of customer premises operating statistics data, may be maintained in various other forms, or the like, as well as various combinations thereof.

The customer care system 140 may be configured to support customer care for the customer premises equipments 111. The customer care system 140 may be configured to support various customer care activities for the customer premises equipments 111, including supporting customer care contacts from customers of the customer premises equipments 111 (e.g., phone calls reporting problems, online submissions reporting problems, or the like, as well as various combinations thereof), customer care ticketing associated with providing customer care for customers of the customer premises equipments 111 (e.g., ticket opening, ticket resolutions, or the like, as well as various combinations thereof), customer care technician management (e.g., supporting remote activities by customer care technicians working to provide customer care for customers of the customer premises equipments 111, supporting dispatching of customer care technicians to the customer premises 110 of the customers of the customer premises equipments 111, or the like, as well as various combinations thereof), or the like, as well as various combinations thereof.

The customer care system 140 may be configured to support predictive care functions for supporting predictive care of the customer premises equipments 111. The customer care system 140 may be configured to generate customer care data within the context of supporting customer care for the customer premises equipments 111, maintain customer care data associated with the customer premises equipments 111, or the like, as well as various combinations thereof. The customer care data may include customer care data included within customer care tickets opened for customer premises equipments 111, customer care data extracted from customer care tickets opened for the customer premises equipments 111, or the like, as well as various combinations thereof. The customer care system 140 may be configured to maintain historical customer care data 141 for use by the customer premises equipment predictive care system 150 in providing predictive care for the customer premises equipments 111. It will be appreciated that the customer care system 140 may be configured to support various other predictive care functions for supporting predictive care of the customer premises equipments 111.

The historical customer care data 141 may include various types of customer care data. The historical customer care data 141 may include raw historical customer care data (e.g., original customer care records, customer care data sourced from original customer care records, or the like), pre-processed historical customer care data (e.g., pre-processed customer care records, pre-processed customer care data sourced from original customer care records prior to processing, or the like), or the like, as well as various combinations thereof. The historical customer care data 141 may include, for each customer care event having a customer care record associated therewith, various types of information which may be sourced from the customer care record created based on the customer care event. For example, historical customer care data which may be obtained from the customer care record created based on the customer care event may include event information associated with the customer care event (e.g., a date and time of the customer care contact by the customer, an indication as to whether a technician was dispatched to the customer premises, or the like, as well as various combinations thereof), problem information associated with a problem which caused the customer care event (e.g., an indication of a problem type of the problem, problem details associated with problem, or the like, as well as various combinations thereof), testing information associated with testing performed to evaluate the problem which caused the customer care event (e.g., types of tests performed, test results resulting from tests performed, or the like, as well as various combinations thereof), condition information associated with a condition which caused the problem that caused the customer care event (e.g., an indication of a condition type of the condition, condition details associated with the condition, or the like, as well as various combinations thereof), c resolution information (e.g., an indication as to how the problem or potential problem which triggered the customer care contact by the customer was resolved, in indication as to how the condition which caused the problem or potential problem which triggered the customer care contact by the customer was resolved, or the like, as well as various combinations thereof), or the like, as well as various combinations thereof. It will be appreciated that the historical customer care data 141 may include various other types of data which may be obtained within the context of providing customer care for the customer premises equipments 111.

The customer premises equipment predictive care system 150 may be configured to support various functions for providing predictive care for the customer premises equipments 111 of the customer premises 110. The customer premises equipment predictive care system 150 may be configured to obtain, for a set of customer premises equipments, time-based customer premises equipment operating statistics data indicative of operation of the set of customer premises equipments, obtain, for the set of customer premises equipments, historical customer care data identifying a set of customer care events triggered for the set of customer premises equipments, learn, based on application of machine learning to the historical customer care data and the time-based customer premises equipment operating statistics data, a learned threshold for a condition experienced by at least a portion of the customer premises equipments, define, for the condition experienced by at least a portion of the customer premises equipments, a predictive signature configured to predict that the condition will be experienced within a time frame, wherein the predictive signature includes an indication of the condition, an operating statistic threshold for the condition that is determined based on the learned threshold, and an action to be performed to address the condition, determine, for a given customer premises equipment based on an operating statistic of the given customer premises equipment, that the predictive signature is detected for the given customer premises equipment, and initiate, for the given customer premises equipment based on the predictive signature, the action to be performed to address the condition.

The customer premises equipment predictive care system 150 may be configured to obtain, for the customer premises equipments 111, the time-based customer premises equipment operating statistics data 131 indicative of operation of the set of customer premises equipments 111. The customer premises equipment predictive care system 150 may obtain the time-based customer premises equipment operating statistics data 131 locally (e.g., where the time-based customer premises equipment operating statistics data 131 has already been provided to the customer premises equipment predictive care system 150), from the customer premises equipment management system 130, or the like, as well as various combinations thereof. It will be appreciated that, although primarily presented with respect to example embodiments in which the time-based customer premises equipment operating statistics data 131 is generated by the customer premises equipment management system 130 and obtained from the customer premises equipment management system 130, in at least some example embodiments the time-based customer premises equipment operating statistics data 131 may be generated by the customer premises equipment predictive care system 150 (e.g., by obtaining, for the customer premises equipments 111, a set of operating statistics measured by the customer premises equipments 111 and a respective set of time stamps indicative of times at which the respective operating statistics were measured by the respective customer premises equipments 111, and associating the time stamps with the operating statistics to form the time-based customer premises equipment operating statistics data 131).

The customer premises equipment predictive care system 150 may be configured to obtain, for the customer premises equipments 111, the historical customer care data 141 identifying a set of customer care events triggered for the customer premises equipments 111. The customer premises equipment predictive care system 150 may obtain the historical customer care data 141 locally (e.g., where the historical customer care data 141 has already been provided to the customer premises equipment predictive care system 150), from the customer care system 140, or the like, as well as various combinations thereof. It will be appreciated that, although primarily presented with respect to example embodiments in which the historical customer care data 141 is generated by the customer care system 140 and obtained from the customer care system 140, in at least some example embodiments the historical customer care data 141 may be generated by the customer premises equipment predictive care system 150 (e.g., by obtaining, for the customer premises equipments 111, a set of customer care records generated based on customer care contacts between the service provider and the customers of the customer premises equipments 111 and processing the customer care records to provide the historical customer care data 141).

The customer premises equipment predictive care system 150 may be configured to learn, based on application of machine learning to the historical customer care data 141 and the time-based customer premises equipment operating statistics data 131, a learned threshold for a condition experienced by at least a portion of the customer premises equipments. The use of machine learning to learn the learned threshold for a particular type of condition may include using machine learning to match time stamps of times at which customer premises equipments 111 experienced that particular type of condition (as determined from the historical customer care data 141) with time stamps of times at which operating statistics were measured by the customer premises equipments 111 (as determined from the time-based customer premises equipment operating statistics data 131) so as to associate occurrences of that particular type of condition with operating conditions at the customer premises equipments 111 when the instances of that particular type of condition occurred. The results of the matching can be further processed based on machine learning to determine trends in the operating statistics of customer premises equipments 111 when the condition occurred and to use the trends in the operating statistics of customer premises equipments 111 when the condition occurred to determine the learn the learned threshold for the particular type of condition. It will be appreciated that the learned threshold for the condition also may be considered to an operating statistic threshold as the learned threshold may be used for evaluating operating statistics of customer premises equipments 111 for determining whether the conditions are predicted for the customer premises equipments 111.

The customer premises equipment predictive care system 150) may be configured to define, for conditions experienced by the customer premises equipments 111, predictive signatures 151 configured for use by the customer premises predictive care system 150 to predict problems for the customer premises equipments 111 before the problems actually occur at the customer premises equipments 111. The predictive signature 151 that is defined for a customer premises equipment condition (or state) may be configured to represent the customer premises equipment condition (or state), with a given health or performance statistic threshold, and a set of one or more automated actions to be taken to resolve the customer premises equipment condition before a problem actually occurs as a result of the customer premises equipment condition. The predictive signature 151 that is defined for a customer premises equipment condition may be configured to predict that the condition will be experienced within a time frame, wherein the predictive signature 151 includes an indication of the condition, an operating statistic threshold for the condition that is determined based on the learned threshold, and an action to be performed to address the condition. It will be appreciated that various types of predictive signatures 151, configured to predict the occurrence of various types of conditions prior to occurrence of problems (e.g., errors, failures, or the like) due to such conditions, may be defined.

For example, a memory leak predictive signature may be created and applied for predicting and preventing the occurrence of a memory leak condition at a CPE. The memory leak predictive signature may be defined as follows: (1) Condition: memory leak, (2) Stat: FreeMemory Status counter on CPE is equal to or less than 5% of total available memory of the CPE, and (3) Action: reboot CPE (e.g., immediately, scheduled during non-active time, or the like).

For example, a WiFi interference predictive signature may be created and applied for predicting and preventing the occurrence of a WiFi interference condition at a CPE. The WiFi interference predictive signature may be defined as follows: (1) Condition: WiFi interference, (2) Stat: wireless interface PacketsDropped and PacketsErrored, and (3) Action: initiate a WiFi channel scan for a new best WiFi channel selection.

For example, an optical temperature anomaly predictive signature may be created and applied for predicting and preventing the occurrence of an optical temperature anomaly condition at a CPE. The optical temperature anomaly predictive signature may be defined as follows: (1) Condition: optical temperature anomaly. (2) Stat: ONT TranceiverTemperature, and (3) Action: initiate a predictive technician dispatch to resolve the problem before possible equipment damage or failure.

The customer premises equipment predictive care system 150 may be configured to maintain the predictive signature 151 for use in predicting problems for the customer premises equipments 111 before the problems actually occur. The customer premises equipment predictive care system 150 may be configured to monitor the customer premises equipments 111, based on the predictive signatures 151, for predicting the occurrence of conditions that are expected to cause problems at the customer premises equipments 111 and initiating preemptive corrective actions to prevent the problems from occurring at the customer premises equipments 111, thereby improving customer experience by preventing the occurrence of problems which negative impact the customer experience of the customers of the customer premises equipments 111 and reducing costs for the service provider by obviating the need for costly customer care contacts between the customers of the customer premises equipments 111 and the customer care resources of the service provider. The application of the predictive signatures 151 to support predictive care for a particular customer premises equipments 111 is discussed further below.

The customer premises equipment predictive care system 150 may be configured to generate, for a condition for which a predictive signature is generated and as an output of application of machine learning to the time-based customer premises equipment operating statistics data 131 and the historical customer care data 141, a predictive index for the condition. The predictive index may be based on two values as follows: (1) a probability value indicative of a probability that a customer will initiate a customer care contact for the condition (e.g., represented as a percentage or other suitable value) and (2) a time frame value associated with the probability value where the time frame value provides an indication of the time frame within which the customer care contact (which may occur with probability defined by the probability value) may occur. For example, for a particular condition, there may be a predictive index indicative of a 75% chance of that particular condition causing an issue which results in a customer care contact within the next 48 hours. Similarly, for example, for a particular condition, there may be a predictive index indicative of an 83% chance of that particular condition causing an issue which results in a customer care contact within the next 72 hours. Similarly, for example, for a particular condition, there may be a predictive index indicative of a 97% chance of that particular condition causing an issue which results in a customer care contact within the next 24 hours. It will be appreciated that multiple such predictive indices may be defined for certain conditions. It will be appreciated that such predictive indices may be used for supporting predictive care of customer premises equipments. It will be appreciated that such predictive indices may form part of predictive signatures and be used for supporting predictive care of customer premises equipments, may be maintained separately from predictive signatures but used in conjunction with predictive signatures for supporting predictive care of customer premises equipments, or the like, as well as various combinations thereof. It will be appreciated that predictive indices may be adapted by the machine learning process over time (e.g., as new time-based customer premises equipment operating statistics data 131 and/or historical customer care data 141 are obtained and processed based on machine learning, or the like, as well as various combinations thereof.

The customer premises equipment predictive care system 150 may be configured to determine, for a given customer premises equipment 111 based on operating statistics of the given customer premises equipment 111, that a predictive signature 151 is detected for the given customer premises equipment 111 and initiate, for the given customer premises equipment 111 based on the detected predictive signature 151, the action defined by the detected predictive signature 151 to preemptively prevent a problem which may result from the condition defined by the detected predictive signature. In this manner, predictive care is provided for the given customer premises equipment 111 to improving the customer experience of the customer of the given customer premises equipment 111 and reducing costs of the service provider for providing service to the given customer premises equipment 111.

The customer premises equipment predictive care system 150 may be configured to determine, for the given customer premises equipment 111 based on operating statistics of the given customer premises equipment 111, that a predictive signature 151 is detected for the given customer premises equipment 111.

The customer premises equipment predictive care system 150 may be configured to obtain the operating statistics of the given customer premises equipment 111, for use in determining if any of the predictive signatures 151 are hits for the given customer premises equipment 111, in various ways. For example, the customer premises equipment predictive care system 150 may receive the operating statistics of the given customer premises equipment 111 from the customer premises equipments 111 directly, from the customer premises equipment management system 130) (e.g., where the customer premises equipment management system monitors the customer premises equipments 111 for obtaining operating statistics from the customer premises equipments 111), or the like, as well as various combinations. For example, the customer premises equipment predictive care system 150 may receive the operating statistics of the given customer premises equipment 111 periodically, in response to one or more conditions, or the like, as well as various combinations thereof. It will be appreciated that the customer premises equipment predictive care system 150 maybe configured to obtain the operating statistics of the given customer premises equipment 111 in various other ways.

The customer premises equipment predictive care system 150 may be configured to search the predictive signatures 151, based on the operating statistics of the given customer premises equipment 111, to determine if any of the conditions defined by any of the predictive signatures 151 are currently being experienced by the given customer premises equipment 111. The customer premises equipment predictive care system 150 may search the predictive signatures 151 by evaluating the condition fields of the predictive signatures 151 (which include the learned operating statistics thresholds against which operating statistics of customer premises equipments 111 may be compared, and which also are referred to herein as the "Stat" field in the examples of predictive signatures provided above) based on the operating statistics of the given customer premises equipment 111 to determine if the given customer premises equipment 111 is experiencing any of the conditions of any of the predictive signatures 151. It will be appreciated that the searching of the predictive signatures 151, based on the operating statistics of the given customer premises equipment 111, to determine if any of the conditions defined by any of the predictive signatures 151 are currently being experienced by the given customer premises equipment 111 may be further understood by considering the specific examples of predictive signatures described hereinabove.

For example, where the operating statistics of the given customer premises equipment 111 include a FreeMemory Status counter value indicative that free memory of the given customer premises equipment 111 is 4% of the total available memory of the given customer premises equipment 111, a "memory leak" condition will be predicted for the given customer premises equipment 111. For example, the "memory leak" predictive signature will be identified as being associated with the given customer premises equipment 111 based on comparison of the FreeMemory Status counter value of 4% with the FreeMemory Status counter threshold value of 5% defined in the "Stat" portion of the "memory leak" predictive signature. As discussed further below, the associated action of the "memory leak" predictive signature may then be initiated for the given customer premises equipment 111 in order to resolve the condition and prevent any resulting problem (e.g., service disruption, failure, or the like) that would otherwise have been detected by the customer and reported by the customer to the service provider in a customer care contact.

For example, where the operating statistics of the given customer premises equipment 111 include wireless interface PacketsDropped and PacketsErrored values indicative of WiFi interference at the given customer premises equipment 111, a "WiFi interference" condition will be predicted for the given customer premises equipment 111. For example, the "WiFi interference" predictive signature will be identified as being associated with the given customer premises equipment 111 based on comparison of the wireless interface PacketsDropped and PacketsErrored values from the operating statistics of the given customer premises equipment 111 with the wireless interface PacketsDropped and PacketsErrored thresholds, respectively, defined in the "Stat" portion of the "WiFi interference" predictive signature. As discussed further below, the associated action of the "WiFi interference" predictive signature may then be initiated for the given customer premises equipment 111 in order to resolve the condition and prevent any resulting problem (e.g., service disruption, failure, or the like) that would otherwise have been detected by the customer and reported by the customer to the service provider in a customer care contact.

For example, where the operating statistics of the given customer premises equipment 111 include an ONT TranceiverTemperature value indicative of an optical temperature anomaly at the given customer premises equipment 111, an "optical temperature anomaly" condition will be predicted for the given customer premises equipment 111. For example, the "optical temperature anomaly" predictive signature will be identified as being associated with the given customer premises equipment 111 based on comparison of the ONT TranceiverTemperature value from the operating statistics of the given customer premises equipment 111 with the ONT TranceiverTemperature threshold defined in the "Stat" portion of the "optical temperature anomaly" predictive signature. As discussed further below; the associated action of the "optical temperature anomaly" predictive signature may then be initiated for the given customer premises equipment 111 in order to resolve the condition and prevent any resulting problem (e.g., service disruption, failure, or the like) that would otherwise have been detected by the customer and reported by the customer to the service provider in a customer care contact.

It will be appreciated that, although primarily presented with respect to detection of a single predictive signature 151 as being associated with the given customer premises equipment 111, multiple predictive signatures 151 may be detected for the given customer premises equipment 111 based on the operating statistics of the given customer premises equipment 111.

The customer premises equipment predictive care system 150 may be configured to initiate, for the given customer premises equipment 111 based on a detected predictive signature 151 detected for the given customer premises equipment 111 based on the operating statistics of the given customer premises equipment 111, the action defined by the detected predictive signature 151. The action defined by the detected predictive signature 151 may include one or more of a reconfiguration action configured to cause a reconfiguration of the given customer premises equipment 111 (e.g., a reconfiguration operation(s) for reconfiguring one or more of a port or a setting(s) of a port(s), an interface or a setting(s) of an interface(s), a memory or a setting(s) of a memory(s), an OS or a setting(s) of an OS(s), a channel being used, or the like, as well as various combinations thereof), a reset operation (e.g., for resetting the given customer premises equipment 111 and/or one or more elements or components of the given customer premises equipment 111), a reboot operation (e.g., for rebooting the given customer premises equipment 111), or the like, as well as various combinations thereof. The action defined by the detected predictive signature 151 also or alternatively may include an action for triggering a customer care contact with the customer of the given customer premises equipment 111 (e.g., a call to the customer by a customer care technician, a dispatch of a customer care technician to the customer premises 110 of the given customer premises equipment 111, or the like, as well as various combinations thereof). It will be appreciated that the detected predictive signature 151 may define various other types of actions which may be performed for preemptively preventing a problem with the given customer premises equipment 111.

The customer premises equipment predictive care system 150 may initiate the action defined by the detected predictive signature 151 in various ways. The customer premises equipment predictive care system 150 may initiate the action defined by the detected predictive signature 151 by sending one or more messages configured to cause the action defined by the detected predictive signature 151 to be performed for the given customer premises equipment 111 (e.g., by the given customer premises equipment 111, on behalf of the given customer premises equipment 111, or the like, as well as various combinations thereof. For example, the customer premises equipment predictive care system 150 may send one or more action messages to the given customer premises equipment 111 to cause one or more actions to be performed at the given customer premises equipment 111, may send one or more action messages to the customer care system 140 for causing the customer care system 140 to perform one or more actions on behalf of the given customer premises equipment 111 and/or for causing the customer care system 140 to initiate one or more messages to the given customer premises equipment 111, may send one or more action messages to the customer premises equipment management system 130 for causing the customer premises equipment management system 130 to perform one or more actions on behalf of the given customer premises equipment 111 and/or for causing the customer premises equipment management system 13 to initiate one or more messages to the given customer premises equipment 111, or the like, as well as various combinations thereof. It will be appreciated that the customer premises equipment predictive care system 150 may initiate the action defined by the detected predictive signature 151 in various other ways.

For example, where the "memory leak" predictive signature is identified as being associated with the given customer premises equipment 111 based on the operating statistics of the given customer premises equipment 111 and the "Stat" portion of the "memory leak" predictive signature, the associated action of the "memory leak" predictive signature may then be initiated for the given customer premises equipment 111 in order to resolve the condition and prevent any resulting problem (e.g., service disruption, failure, or the like) that would otherwise have been detected by the customer and reported by the customer to the service provider in a customer care contact. As indicated above, the action indicated for the "memory leak" predictive signature includes rebooting the given customer premises equipment 111, so the customer premises equipment predictive care system 150 sends a message to the given customer premises equipment 111 with an instruction to perform at reboot of the given customer premises equipment 111.

For example, where the "WiFi interference" predictive signature is identified as being associated with the given customer premises equipment 111 based on the operating statistics of the given customer premises equipment 111 and the "Stat" portion of the "WiFi interference" predictive signature, the associated action of the "WiFi interference" predictive signature may then be initiated for the given customer premises equipment 111 in order to resolve the condition and prevent any resulting problem (e.g., service disruption, failure, or the like) that would otherwise have been detected by the customer and reported by the customer to the service provider in a customer care contact. As indicated above, the action indicated for the "WiFi interference" predictive signature includes initiate a WiFi channel scan for a new best WiFi channel selection, so the customer premises equipment predictive care system 150 sends a message to the given customer premises equipment 111 with an instruction to perform a WiFi channel scan at the given customer premises equipment 111 so that the given customer premises equipment 111 switches to a better WiFi channel.

For example, where the "optical temperature anomaly" predictive signature is identified as being associated with the given customer premises equipment 111 based on the operating statistics of the given customer premises equipment 111 and the "Stat" portion of the "optical temperature anomaly" predictive signature, the associated action of the "optical temperature anomaly" predictive signature may then be initiated for the given customer premises equipment 111 in order to resolve the condition and prevent any resulting problem (e.g., service disruption, failure, or the like) that would otherwise have been detected by the customer and reported by the customer to the service provider in a customer care contact. As indicated above, the action indicated for the "optical temperature anomaly" predictive signature includes initiating a predictive technician dispatch to resolve the problem before possible equipment damage or failure so the customer premises equipment predictive care system 150 sends a message to the customer care system 140 with an instruction for the customer care system 140 to schedule dispatch of a technician to the customer premises 110 associated with the given customer premises equipment 111.

The customer premises equipment predictive care system 150 may be configured to support a customer premises equipment "intensive care" mode in which, under certain circumstances, specific customer premises equipments may be automatically placed in an advanced monitoring state (e.g., a highly supervised state in which there is more frequent collection and analysis of operating parameters from the customer premises equipments). This may be applied to customer premises equipments for various reasons. For example, the "intensive care" mode may be applied to customer premises equipments associated with new customers (e.g., assuring "First-Time Right" installations by defaulting new customers into an accelerated data collection and analysis phase in which special care and scrutiny is placed on the customer premises equipments for the first fourteen days of services, after which the customer premises equipment goes back into the regular polling interval (which is less intensive in resources and storage). For example, the "intensive care" mode may be applied to a customer premises equipment based on detection of a predictive signature for the customer premises equipment (e.g., the customer premises equipment is automatically placed in a detailed data collection and analysis phase for 48 hours and, if the associated condition does not clear automatically, the customer premises is promoted to resolution through an automated next-best action or referred to tiered support).

It will be appreciated that the customer premises equipment predictive care system 150 may be configured to support various other predictive care capabilities for supporting predictive care for the customer premises equipments.

It will be appreciated that, although primarily presented as being standalone systems, various functions of the customer premises equipment management system 130, the customer care system 140, and the customer premises equipment predictive care system 150 may be combined in various ways (e.g., customer premises equipment management system 130) and the customer care system 140 may be implemented together, customer care system 140) and customer premises equipment predictive care system 150) may be implemented together, or the like), may be distributed in various other ways, or the like, as well as various combinations thereof.

FIG. 2 depicts an example embodiment of a method for supporting predictive care of customer premises equipments. It will be appreciated that, although primarily presented herein as being performed serially, at least a portion of the functions of method 200 may be performed contemporaneously or in a different order than as presented in FIG. 2.

At block 201, the method 200 begins.

At block 210, define, for a condition experienced by a set of customer premises equipments and based on use of machine learning for processing historical customer care data associated with the set of customer premises equipments and the time-based customer premises equipment operating statistics data associated with the set of customer premises equipments, a predictive signature configured to predict that the condition will be experienced within a time frame, wherein the predictive signature includes an indication of the condition, an operating statistic threshold for the condition, and an action to be performed to address the condition. It will be appreciated that, in at least some example embodiments, the block 210 may be provided using the method of FIG. 3 or portions thereof.

At block 220, initiate, for a given customer premises equipment based on a determination that the predictive signature is detected for the given customer premises equipment based on an operating statistic of the given customer premises equipment, the action to be performed to address the condition. It will be appreciated that, in at least some example embodiments, the block 220 may be provided using the method of FIG. 4 or portions thereof.

At block 299, the method 200 ends.

It will be appreciated that various predictive care capabilities depicted and described within the context of the communication system 100 of FIG. 1 also and/or alternatively may be incorporated into the method 200 of FIG. 2.

FIG. 3 depicts an example embodiment of a method for generating a predictive signature for use in supporting predictive care of customer premises equipments. It will be appreciated that, in at least some example embodiments, the method 300 of FIG. 3 (or portions thereof) may be used to provide block 210 of FIG. 2. It will be appreciated that, although primarily presented herein as being performed serially, at least a portion of the functions of method 300 may be performed contemporaneously or in a different order than as presented in FIG. 3.

At block 301, the method 300 begins.

At block 310, obtain, for a set of customer premises equipments, time-based customer premises equipment operating statistics data indicative of operation of the set of customer premises equipments.

At block 320, obtain, for the set of customer premises equipments, historical customer care data identifying a set of customer care events triggered for the set of customer premises equipments.

At block 330, learn, based on application of machine learning to the historical customer care data and the time-based customer premises equipment operating statistics data, a learned threshold for a condition experienced by at least a portion of the customer premises equipments At block 340, define, for the condition experienced by at least a portion of the customer premises equipments, a predictive signature configured to predict that the condition will be experienced within a time frame, wherein the predictive signature includes an indication of the condition, an operating statistic threshold for the condition that is determined based on the learned threshold, and an action to be performed to address the condition.

At block 399, the method 300 ends.

It will be appreciated that various predictive care capabilities depicted and described within the context of the communication system 100 of FIG. 1 also and/or alternatively may be incorporated into the method 300 of FIG. 3.

FIG. 4 depicted an example embodiment of a method for using a predictive signature for supporting predictive care of customer premises equipments. It will be appreciated that, in at least some example embodiments, the method 400 of FIG. 4 (or portions thereof) may be used to provide block 220 of FIG. 2. It will be appreciated that, although primarily presented herein as being performed serially, at least a portion of the functions of method 400 may be performed contemporaneously or in a different order than as presented in FIG. 4.

At block 401, the method 400 begins.

At block 410, determine, for a given customer premises equipment based on an operating statistic of the given customer premises equipment, that a predictive signature is detected for the given customer premises equipment, wherein the predictive signature is configured to indicate that a condition will be experienced by the customer premises within a time frame, wherein the predictive signature includes an indication of the condition, an operating statistic threshold for the condition, and an action to be performed to address the condition.

At block 420, initiate, for the given customer premises equipment based on the predictive signature, the action to be performed to address the condition.

At block 499, the method 400 ends.

It will be appreciated that various predictive care capabilities depicted and described within the context of the communication system 100 of FIG. 1 also and/or alternatively may be incorporated into the method 400 of FIG. 4.

FIG. 5 depicts an example embodiment of a method for supporting predictive care of customer premises equipments. It will be appreciated that, although primarily presented herein as being performed serially, at least a portion of the functions of method 500 may be performed contemporaneously or in a different order than as presented in FIG. 5.

At block 501, the method 500 begins.

At block 510, obtain, for a set of customer premises equipments, time-based customer premises equipment operating statistics data indicative of operation of the set of customer premises equipments.

At block 520, obtain, for the set of customer premises equipments, historical customer care data identifying a set of customer care events triggered for the set of customer premises equipments.

At block 530, learn, based on application of machine learning to the historical customer care data and the time-based customer premises equipment operating statistics data, a learned threshold for a condition experienced by at least a portion of the customer premises equipments At block 540, define, for the condition experienced by at least a portion of the customer premises equipments, a predictive signature configured to predict that the condition will be experienced within a time frame, wherein the predictive signature includes an indication of the condition, an operating statistic threshold for the condition that is determined based on the learned threshold, and an action to be performed to address the condition.

At block 550, determine, for a given customer premises equipment based on an operating statistic of the given customer premises equipment, that the predictive signature is detected for the given customer premises equipment.

At block 560, initiate, for the given customer premises equipment based on the predictive signature, the action to be performed to address the condition.

At block 599, the method 500 ends.

It will be appreciated that various predictive care capabilities depicted and described within the context of the communication system 100 of FIG. 1 also and/or alternatively may be incorporated into the method 500 of FIG. 5.

Various example embodiments for supporting predictive care of customer premises equipments may provide various advantages or potential advantages. For example, various example embodiments for supporting predictive care of customer premises equipments may be configured to support predictive, proactive care, rather than reactive care, by accurately predicting impending problems before the impending problems occur and taking proactive steps to prevent the impending problems from occurring. For example, various example embodiments for supporting predictive care of customer premises equipments may be configured to provide predictive care to prevent problems before they occur, thereby obviating the need to initiate corrective actions after problems have occurred (e.g., based on static use of "counters" to detect problems) and, thus, improving customer quality of experience and lowering service provider OPEX by preventing unnecessary customer care contacts (e.g., calls and dispatches). For example, various example embodiments for supporting predictive care of customer premises equipments may be configured to obviate a need for static use of data points (e.g., in which thresholds are statically configured through expensive domain knowledge) for reactive care of customer premises equipments by supporting predictive care for the customer premises equipments based on continuously learning and adapting data point thresholds (e.g., evolving with the customer premises equipments, the network, or the like) to support prediction of problems before the problems occur. For example, various example embodiments for supporting predictive care of customer premises equipments may be configured to provide a predictive index of a customer care issue within a particular time frame (e.g., within the next 24 hours, 48 hours, week, month or the like) to enable actions for prevention of problems before the problems actually occur. Various example embodiments for supporting predictive care of customer premises equipments may be configured to enable identification of signatures of customer premises equipments that are indicative that the customer premises equipments that are trending toward experiencing conditions which may cause problems (e.g., error, failures, or other problems which might negatively impact service for the customers), thereby enabling the service provider to proactively initiate actions to prevent or alleviate the conditions which, if not addressed, could cause problems, thereby enhancing the end-user experience for customers (e.g., by preventing errors and failures before they occur) and reducing expenditures for the service provider (e.g., reducing OPEX by obviating the need for dispatching of technicians to customer premises, reducing CAPEX by preventing problems that might otherwise have resulted in damage to equipment such as the customer premises equipments, or the like, as well as various combinations thereof). For example, various example embodiments for supporting predictive care of customer premises equipments may be configured to support predictive care of customer premises equipments in a highly dynamic environment (e.g., where there may be changes to conditions at the customer premises equipments, changes to software on the customer premises equipments, changes to network conditions in the network supporting the customer premises equipments, or the like, as well as various combinations thereof) without a need for constant intervention (e.g., planning, tuning, and so forth) which typically results in significantly greater false positives, complexity, and cost. For example, various example embodiments for supporting predictive care of customer premises equipments may be configured to support a customer premises equipment "intensive care" mode in which, under certain circumstances, specific customer premises equipments may be automatically placed in an advanced monitoring state (e.g., in which there is more frequent collection and analysis of operating parameters from the customer premises equipments). For example, various example embodiments for supporting predictive care of customer premises equipments may be configured to obviate the need for use of traditional thresholding and monitoring of counters and statistics and traditional alarming (e.g., Simple Network Management Protocol (SNMP) alarming, Network Configuration Protocol (NETCONF) alarming, or the like) based on such thresholding and monitoring, which generally are not truly effective or adaptable and which generally require significant intervention and support, all of which leads to increased OPEX by the service provider. Various example embodiments for supporting predictive care of customer premises equipments may provide various other advantages or potential advantages.

Figure 6:
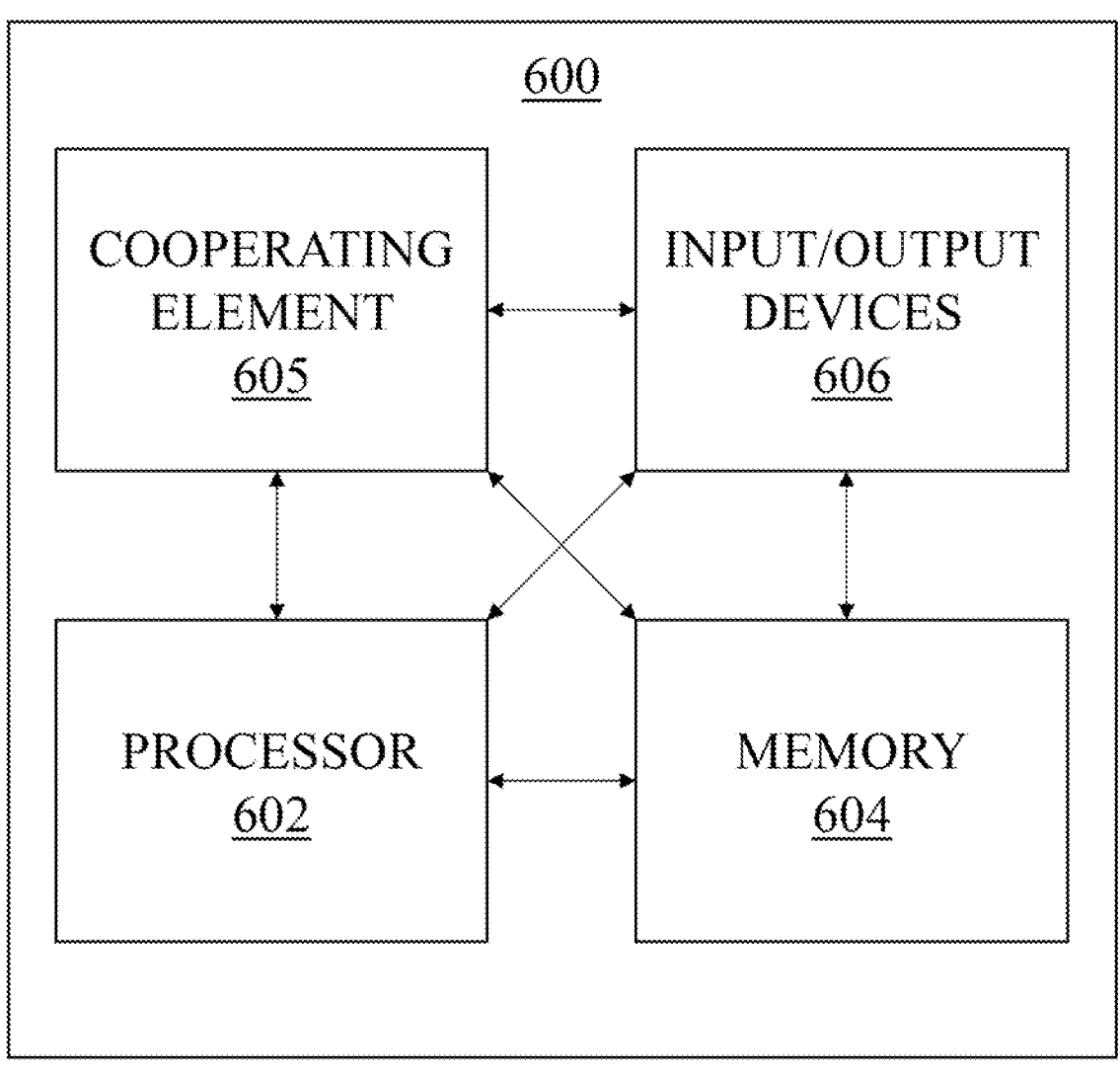
FIG. 6 depicts an example embodiment of a computer suitable for use in performing various functions presented herein.

FIG. 6 depicts an example embodiment of a computer suitable for use in performing various functions presented herein.

The computer 600 includes a processor 602 (e.g., a central processing unit (CPU), a processor, a processor having a set of processor cores, a processor core of a processor, or the like) and a memory 604 (e.g., a random access memory (RAM), a read-only memory (ROM), or the like). In at least some example embodiments, the computer 600 may include at least one processor and at least one memory storing instructions that, when executed by the at least one processor, cause the computer to perform various functions presented herein.

The computer 600 also may include a cooperating element 605. The cooperating element 605 may be a hardware device. The cooperating element 605 may be a process that can be loaded into the memory 604 and executed by the processor 602 to implement various functions presented herein (in which case, for example, the cooperating element 605 (including associated data structures) can be stored on a non-transitory computer readable medium, such as a storage device or other suitable type of storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 may represent a general architecture and functionality suitable for implementing functional elements described herein, portions of functional elements described herein, or the like, as well as various combinations thereof. For example, computer 600 may provide a general architecture and functionality that is suitable for implementing one or more elements presented herein.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory." as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:

at least one processor; and at least one memory storing instructions that, when executed by the at least one processor, cause the apparatus at least to:

obtain, for a set of customer premises equipments, time-based customer premises equipment operating statistics data indicative of operation of the set of customer premises equipments;

obtain, for the set of customer premises equipments, historical customer care data identifying a set of customer care events triggered for the set of customer premises equipments;

learn, based on application of machine learning to the historical customer care data and the time-based customer premises equipment operating statistics data, a learned threshold for a condition experienced by at least a portion of the customer premises equipments, wherein the learned threshold for the condition represents a state of the condition at which a customer care action would be triggered for addressing the condition;

determine, based on the learned threshold for the condition, an operating statistic threshold for the condition; and define, for the condition experienced by at least a portion of the customer premises equipments, a predictive signature configured to predict that the condition will be experienced by the customer premises equipments within a time frame, wherein the predictive signature includes an indication of the condition, the operating statistic threshold for the condition, and an action to be performed to address the condition;

determine, for a given customer premises equipment based on an operating statistic of the given customer premises equipment, that the predictive signature is detected for the given customer premises equipment, wherein the predictive signature includes a memory leak predictive signature in which the condition is a memory leak condition, the operating statistic threshold relates to a free memory statistic, and the action to be performed includes a reboot operation; and initiate, for the given customer premises equipment based on detection of the predictive signature for the given customer premises equipment, the action to be performed to address the condition.

2. The apparatus of claim 1, wherein the time-based customer premises equipment operating statistics data includes at least one of a set of time-based customer premises equipment health statistics associated with ones of the customer premises equipment or a set of time-based customer premises equipment performance statistics associated with ones of the customer premises equipment.

3. The apparatus of claim 1, wherein the time-based customer premises equipment operating statistics data includes at least one of a set of time-based operating statistics curves or a set of time-based operating statistics traces.

4. The apparatus of claim 1, wherein, to obtain the time-based customer premises equipment operating statistics data, the instructions, when executed by the at least one processor, cause the apparatus to:

obtain, for the set of customer premises equipments, a set of operating statistics measured by the customer premises equipments and a respective set of time stamps indicative of times at which the respective operating statistics were measured by the respective customer premises equipments; and associate the time stamps with the operating statistics to form the time-based customer premises equipment operating statistics data.

5. The apparatus of claim 4, wherein the set of operating statistics measured by the customer premises equipments includes at least one of a set of customer premises equipment health statistics associated with ones of the customer premises equipment or a set of customer premises equipment performance statistics associated with ones of the customer premises equipment.

6. The apparatus of claim 4, wherein, for at least one of the customer premises equipments, the set of operating statistics measured by the respective customer premises equipment includes at least one of at least one a wide area network statistic associated with a wide area network supporting the respective customer premises equipment, a radio access network statistic associated with a radio access network supporting the respective customer premises equipment, a WiFi statistic associated with a WiFi network supporting the respective customer premises equipment, an operating system statistic associated with operation of an operating system of the respective customer premises equipment, an application statistic associated with an application running on the respective customer premises equipment, or an environmental statistic associated with the respective customer premises equipment.

7. The apparatus of claim 4, wherein the set of operating statistics measured by the customer premises equipments is received from at least one of the set of customer premises equipments or a customer premises equipment management system configured to provide management functions for the set of customer premises equipments.

8. The apparatus of claim 1, wherein the time-based customer premises equipment operating statistics data is obtained from a time-series database configured to store a set of operating statistics measured by the customer premises equipments and a respective set of time stamps indicative of times at which the respective operating statistics were measured by the respective customer premises equipments.

9. The apparatus of claim 1, wherein the historical customer care data includes at least one of customer care ticket data for a set of customer care tickets opened for the set of customer premises equipments, customer care workflow data for a set of customer care workflow operations performed for the set of customer premises equipments, or customer care dispatch data for a set of customer care dispatch events performed for the set of customer premises equipments.

10. The apparatus of claim 1, wherein the historical customer care data is obtained from a service provider workflow management platform.

11. The apparatus of claim 1, wherein the operating statistic threshold for the condition is determined, based on the learned threshold, in a manner tending to decrease a probability that the condition is experienced at a customer premises equipment and results in a failure of the customer premises equipment.

12. The apparatus of claim 1, wherein the predictive signature includes a predictive index based on a probability value indicative of a probability that a customer will initiate a customer care contact for the condition and a time frame value associated with the probability value where the time frame value provides an indication of a time frame within which the customer care contact may occur.

13. The apparatus of claim 12, wherein the instructions, when executed by the at least one processor, cause the apparatus at least to:

obtain, for the set of customer premises equipments, new time-based customer premises equipment operating statistics data indicative of operation of the set of customer premises equipments;

obtain, for the set of customer premises equipments, new historical customer care data identifying a new set of customer care events triggered for the set of customer premises equipments; and adapting, based on processing of at least one of the new time-based customer premises equipment operating statistics data or the new historical customer care data using a machine learning process, the predictive index of the predictive signature.

14. An apparatus, comprising:

at least one processor; and at least one memory storing instructions that, when executed by the at least one processor, cause the apparatus at least to:

maintain a predictive signature configured to indicate that a condition will be experienced within a time frame, wherein the predictive signature includes an indication of the condition, an operating statistic threshold for the condition, and an action to be performed to address the condition, wherein the operating statistic threshold is based on a learned threshold for the condition determined based on a set of customer premises equipments, wherein the learned threshold for the condition is based on application of machine learning to historical customer care data for the set of customer premises equipments and time-based customer premises equipment operating statistics data for the set of customer premises equipments, wherein the learned threshold for the condition represents a state of the condition at which a customer care action would be triggered for addressing the condition;

obtain, for a given customer premises equipment, an operating statistic of the given customer premises equipment;

determine, based on comparison of the operating statistic of the given customer premises equipment and the operating statistic threshold of the predictive signature, that the predictive signature is detected for the given customer premises equipment, wherein the predictive signature includes at least one of:

a memory leak predictive signature in which the condition is a memory leak condition, the operating statistic threshold relates to a free memory statistic, and the action to be taken includes a reboot operation;

a wireless signal interference predictive signature in which the condition is a wireless interference condition, the operating statistic threshold relates to at least one of a packets dropped statistics or a packets errored statistic, and the action to be taken includes a wireless channel switching operation; or a temperature anomaly predictive signature in which the condition is a temperature anomaly condition, the operating statistic threshold relates to a customer premises equipment temperature statistic, and the action to be taken includes at least one of sending a message to a customer or dispatching a technician; and initiate, for the given customer premises equipment based on the predictive signature, the action to be performed to address the condition.

15. The apparatus of claim 14, wherein, to initiate the action to be performed to address the condition, the instructions, when executed by the at least one processor, cause the apparatus at least to:

identify, from the predictive signature based on detection of the predictive signature for the given customer premises equipment, the action to be performed to address the condition; and send, toward the given customer premises equipment, a message including an indication of the action to be performed to address the condition.

16. The apparatus of claim 14, wherein the action to be performed to address the condition includes at least one of a reconfiguration of the given customer premises equipment, a reset of the given customer premises equipment, or a reboot of the given customer premises equipment.

17. An apparatus, comprising:

at least one processor; and at least one memory storing instructions that, when executed by the at least one processor, cause the apparatus at least to:

obtain, for a set of customer premises equipments, time-based customer premises equipment operating statistics data indicative of operation of the set of customer premises equipments;

obtain, for the set of customer premises equipments, historical customer care data identifying a set of customer care events triggered for the set of customer premises equipments;

learn, based on application of machine learning to the historical customer care data and the time-based customer premises equipment operating statistics data, a learned threshold for a condition experienced by at least a portion of the customer premises equipments, wherein the learned threshold for the condition represents a state of the condition at which a customer care action would be triggered for addressing the condition;

determine, based on the learned threshold for the condition, an operating statistic threshold for the condition; and define, for the condition experienced by at least a portion of the customer premises equipments, a predictive signature configured to predict that the condition will be experienced by the customer premises equipments within a time frame, wherein the predictive signature includes an indication of the condition, the operating statistic threshold for the condition, and an action to be performed to address the condition;

determine, for a given customer premises equipment based on an operating statistic of the given customer premises equipment, that the predictive signature is detected for the given customer premises equipment, wherein the predictive signature includes a wireless signal interference predictive signature in which the condition is a wireless interference condition, the operating statistic threshold relates to at least one of a packets dropped statistics or a packets errored statistic, and the action to be taken includes a wireless channel switching operation; and initiate, for the given customer premises equipment based on detection of the predictive signature for the given customer premises equipment, the action to be performed to address the condition.

18. An apparatus, comprising:

at least one processor; and at least one memory storing instructions that, when executed by the at least one processor, cause the apparatus at least to:

obtain, for a set of customer premises equipments, time-based customer premises equipment operating statistics data indicative of operation of the set of customer premises equipments;

obtain, for the set of customer premises equipments, historical customer care data identifying a set of customer care events triggered for the set of customer premises equipments;

learn, based on application of machine learning to the historical customer care data and the time-based customer premises equipment operating statistics data, a learned threshold for a condition experienced by at least a portion of the customer premises equipments, wherein the learned threshold for the condition represents a state of the condition at which a customer care action would be triggered for addressing the condition;

determine, based on the learned threshold for the condition, an operating statistic threshold for the condition; and define, for the condition experienced by at least a portion of the customer premises equipments, a predictive signature configured to predict that the condition will be experienced by the customer premises equipments within a time frame, wherein the predictive signature includes an indication of the condition, the operating statistic threshold for the condition, and an action to be performed to address the condition;

determine, for a given customer premises equipment based on an operating statistic of the given customer premises equipment, that the predictive signature is detected for the given customer premises equipment, wherein the predictive signature includes a temperature anomaly predictive signature in which the condition is a temperature anomaly condition, the operating statistic threshold relates to a customer premises equipment temperature statistic, and the action to be taken includes at least one of sending a message to a customer or dispatching a technician; and initiate, for the given customer premises equipment based on detection of the predictive signature for the given customer premises equipment, the action to be performed to address the condition.

\* \* \* \* \*